United States Patent
Lin et al.

(10) Patent No.: US 9,586,320 B2
(45) Date of Patent: Mar. 7, 2017

(54) SYSTEM AND METHOD FOR CONTROLLING A VISION GUIDED ROBOT ASSEMBLY

(71) Applicant: GM GLOBAL TECHNOLOGY OPERATIONS LLC, Detroit, MI (US)

(72) Inventors: Yhu-Tin Lin, Rochester Hills, MI (US); Timothy Daro, Lake Orion, MI (US); Jeffrey A. Abell, Rochester Hills, MI (US); Raymond D. Turner, III, Canadensis, PA (US); Daniel J. Casoli, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 14/493,942

(22) Filed: Sep. 23, 2014

(65) Prior Publication Data
US 2015/0100162 A1    Apr. 9, 2015

Related U.S. Application Data

(60) Provisional application No. 61/886,764, filed on Oct. 4, 2013.

(51) Int. Cl.
| | |
|---|---|
| *G05B 15/00* | (2006.01) |
| *G05B 19/00* | (2006.01) |
| *B25J 9/16* | (2006.01) |
| *B25J 9/00* | (2006.01) |

(52) U.S. Cl.
CPC ............ *B25J 9/1697* (2013.01); *B25J 9/0093* (2013.01); *Y10S 901/09* (2013.01)

(58) Field of Classification Search
USPC .................................................. 700/245–264
See application file for complete search history.

(56) References Cited

U.S. PATENT DOCUMENTS

| 5,513,299 | A | * | 4/1996 | Terasaki | B25J 9/1661 |
| | | | | | 700/255 |
| 5,530,791 | A | * | 6/1996 | Okabayashi | B25J 9/1666 |
| | | | | | 700/255 |
| 6,278,906 | B1 | * | 8/2001 | Piepmeier | B25J 9/1607 |
| | | | | | 700/245 |
| 6,328,523 | B1 | * | 12/2001 | Watanabe | B25J 9/1687 |
| | | | | | 198/396 |
| 7,200,260 | B1 | * | 4/2007 | Watanabe | B25J 9/1692 |
| | | | | | 382/103 |

(Continued)

*Primary Examiner* — Bhavesh V Amin
(74) *Attorney, Agent, or Firm* — Quinn Law Group, PLLC

(57) ABSTRACT

A method includes the following steps: actuating a robotic arm to perform an action at a start position; moving the robotic arm from the start position toward a first position; determining from a vision process method if a first part from the first position will be ready to be subjected to a first action by the robotic arm once the robotic arm reaches the first position; commencing the execution of the visual processing method for determining the position deviation of the second part from the second position and the readiness of the second part to be subjected to a second action by the robotic arm once the robotic arm reaches the second position; and performing a first action on the first part using the robotic arm with the position deviation of the first part from the first position predetermined by the vision process method.

20 Claims, 3 Drawing Sheets

(56) References Cited

U.S. PATENT DOCUMENTS

| | | | | |
|---|---|---|---|---|
| 7,269,479 | B2 * | 9/2007 | Okamoto | B25J 5/007 318/568.12 |
| 7,817,847 | B2 * | 10/2010 | Hashimoto | B25J 9/1697 382/141 |
| 7,818,091 | B2 * | 10/2010 | Kazi | B25J 9/1697 318/568.1 |
| 8,600,552 | B2 * | 12/2013 | Nakajima | B25J 9/1697 700/245 |
| 8,805,585 | B2 * | 8/2014 | Nishihara | B25J 9/1697 198/339.1 |
| 8,923,602 | B2 * | 12/2014 | Melikian | B25J 9/1697 382/152 |
| 2007/0124024 | A1 * | 5/2007 | Okamoto | B25J 5/007 700/245 |
| 2008/0082213 | A1 * | 4/2008 | Ban | B25J 9/1697 700/260 |
| 2009/0069939 | A1 * | 3/2009 | Nagatsuka | B25J 9/1671 700/258 |
| 2011/0270444 | A1 * | 11/2011 | Nagata | G05B 19/401 700/258 |
| 2012/0253516 | A1 * | 10/2012 | Iida | B25J 9/1669 700/258 |

\* cited by examiner

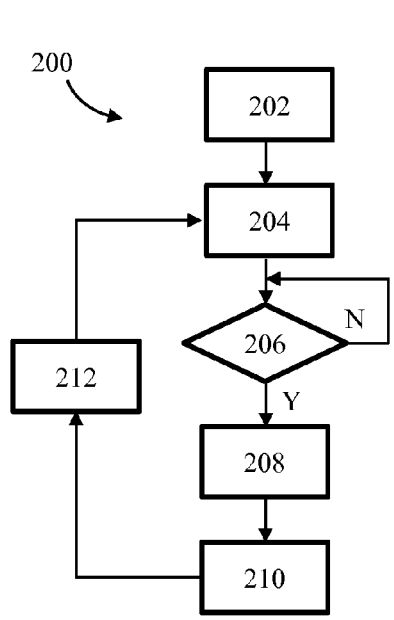
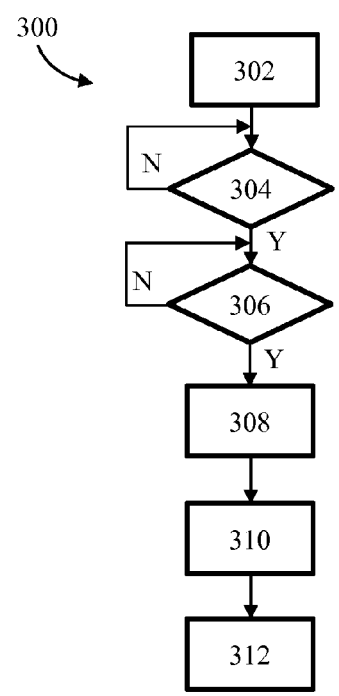
*FIG. 2*  *FIG. 3*

SYSTEM AND METHOD FOR CONTROLLING A VISION GUIDED ROBOT ASSEMBLY

CROSS-REFERENCE TO RELATED APPLICATIONS

This application claims the benefit of U.S. Provisional Application No. 61/886,764, filed Oct. 4, 2013, which is hereby incorporated by reference in its entirety.

GOVERNMENT LICENSE RIGHTS

This invention was made with government support under contract number DE-EE-0002217 awarded by the Department of Energy. The government has certain rights in the invention.

TECHNICAL FIELD

The present disclosure relates to a system and method for controlling a robot assembly.

BACKGROUND

At least some manufacturing processes employ robot assembly to assemble certain apparatus. For example, batteries can be assembled using a robot assembly. The robot assembly includes at least one movable robotic arm capable of performing an action on a part, such as drilling or welding. Conventional robot assembly employs precision tooling, fixture or pallets, that allows the robot to handle parts at preprogrammed positions and orientations. That rigid, costly part locating also restricts the flexibility of robot assembly to a specific or single apparatus.

Robot assembly with camera vision for part position guidance is the new way to assemble parts without precision, expensive part locating hardware and thus make production more flexible and cost effective. However, capturing and processing vision images takes time and proper setup for the desired accuracy and reliability of robotic guidance. It is therefore useful to control the robotic arm manipulation and vision process cohesively in order to optimize the manufacturing process and thereby minimize the time necessary to completely assemble an apparatus using the robotic system.

SUMMARY

The present disclosure relates to a method for controlling a robot assembly using cameras. In the presently disclosed method, the cameras can be used to guide the movement of a robotic arm of the robot assembly. By using the presently disclosed method, the cameras capture an image of a part while the robotic arm is in motion instead of waiting for the robotic arm to reach its target position, thereby minimizing the cycle time of a manufacturing process.

In an embodiment, the method includes a main process having the following steps: actuating a robotic arm to perform an action at a start position; moving the robotic arm from the start position toward a first position; determining from a vision process method if a first part from the first position will be ready to be subjected to a first action by the robotic arm once the robotic arm reaches the first position; commencing the execution of the visual processing method for determining the position deviation of the second part from the second position and the readiness of the second part to be subjected to a second action by the robotic arm once the robotic arm reaches the second position; and performing a first action on the first part using the robotic arm with the position deviation of the first part from the first position predetermined by the vision process method. The steps repeat for the next robot assembly cycle with the first position and action being re-designated as the new start position and action respectively, the second part, position and action as the new first part, position and action respectively, and the position deviation of the second part as the position deviation of the new first part.

The method also include the vision process method, an embedded process working continuously in the background, having the following steps: identifying the next part from a designated position to be subjected to an action; checking if a camera is ready to capture the image of the identified part from the designated position; checking if the identified part is in position for image capturing; capturing an image of the identified part from the designated position using a camera while the robotic arm is moving toward the designated position; determining a position deviation of the identified part from the designated position based at least in part on the position of the identified part while the robotic arm is moving toward the designated position; setting the status of the identified part from the designated position to be ready to be subjected to an action.

The present disclosure also relates to systems for controlling a robot assembly. In an embodiment, the system includes a robot assembly including a robotic arm and an arm actuator operatively coupled to the robotic arm. The arm actuator is configured to move the robotic arm from a first position to a second position. The system further includes a conveyor assembly including a plurality of conveyor belts. Each conveyor belt is configured to move a plurality of parts, including a first part and a second part. The system also includes a visual assembly including a plurality of cameras. Each camera is aligned with at least one of the conveyor belts. As such, each camera is configured to capture an image of at least one of the parts. The system additionally includes a system controller in electronic communication with the arm actuator and the plurality of cameras and conveyor belts. The system controller is programmed to execute the following instructions: actuate a robotic arm to perform an action at a start position; move the robotic arm from the start position toward a first position; determine from a vision process method if a first part from the first position will be ready to be subjected to a first action by the robotic arm once the robotic arm reaches the first position; commence the execution of the visual processing method for determining the position deviation of the second part from the second position and the readiness of the second part to be subjected to a second action by the robotic arm once the robotic arm reaches the second position; and performing a first action on the first part using the robotic arm with the position deviation of the first part from the first position predetermined by the vision process method. The steps repeat for the next robot assembly cycle with the first position and action being re-designated as the new start position and action respectively, the second part, position and action as the new first part, position and action respectively, and the position deviation of the second part as the position deviation of the new first part.

The system controller is also programmed to execute the vision process method, an embedded process working continuously in the background. The vision process method includes the following steps: identifying the next part from a designated position to be subjected to an action; checking if a camera is ready to capture the image of the identified part from the designated position; checking if the identified part is in position for image capturing; capturing an image of the identified part from the designated position using a camera while the robotic arm is moving toward the designated position; determining a position deviation of the identified part from the designated position based at least in part on the position of the identified part while the robotic arm is moving toward the designated position; setting the status of the identified part from the designated position to be ready to be subjected to an action.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a flowchart illustrating a method of controlling the robot assembly;

FIG. 3 is a flowchart illustrating a visual processing method, which may be part of the method illustrated in FIG. 2.

DETAILED DESCRIPTION

Figure 1:
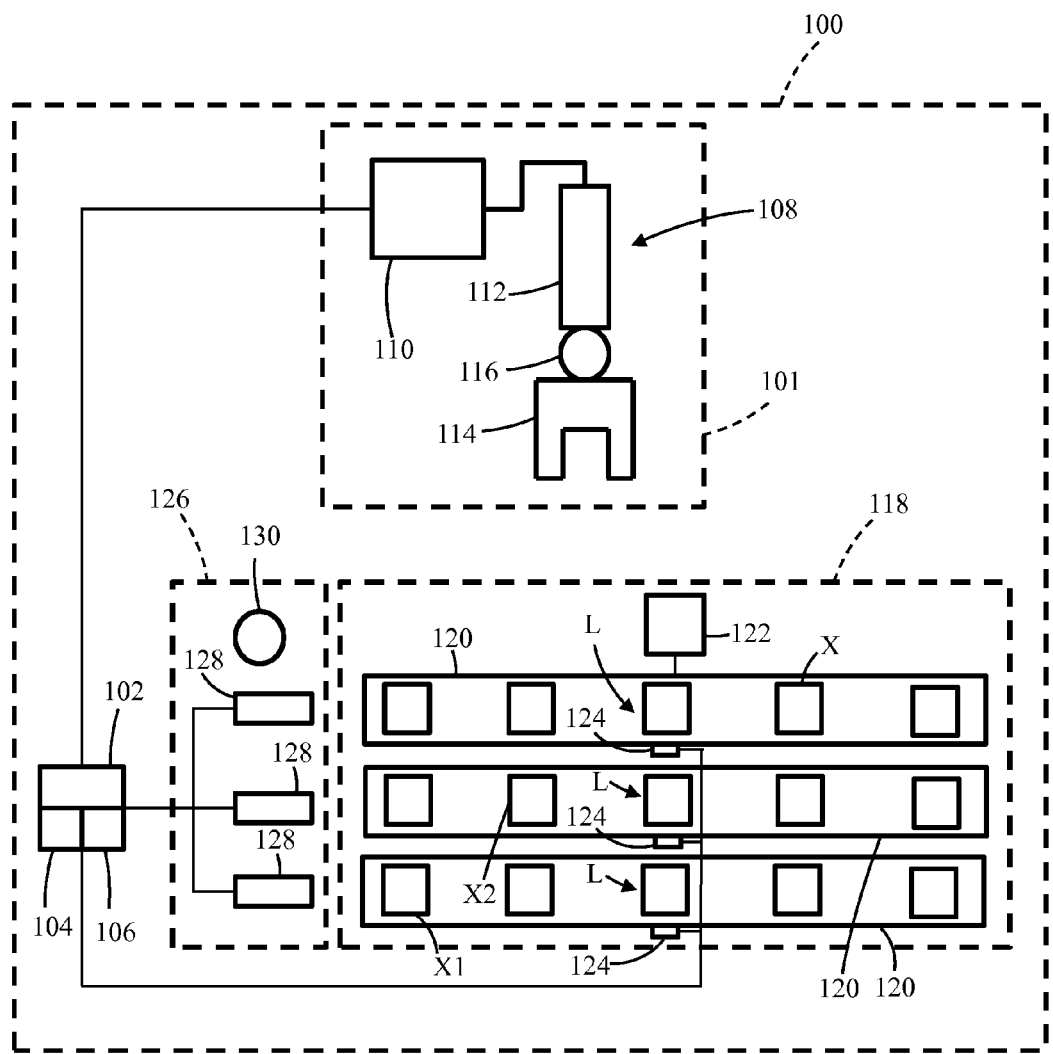
FIG. 1 is a schematic block diagram of a system for assembling an apparatus, wherein the system can control a robot assembly.

Referring to the Figures, where like numbers correspond to like or similar components throughout the several views, FIG. 1 schematically illustrates a system 100 for assembling an apparatus (e.g., a battery) made of a plurality of parts X. The system 100 includes a system controller 102 having at least one processor 104 and at least one memory 106 (or any suitable non-transitory computer readable storage medium). The processor 104 may be one or various combinations of an Application Specific Integrated Circuit(s) (ASIC), electronic circuit(s), and central processing unit(s) (e.g., microprocessor(s)). The memory 106 may be one or various combinations of a read only memory, programmable read only memory, random access memory, hard drive or any other suitable non-transitory computer-readable storage medium. The processor 104 can execute controller executable instructions stored in the memory 106. The controller executable instructions may be software or firmware programs or routines, combinational logic circuit(s), sequential logic circuit(s), input/output circuit(s) and apparatus, appropriate signal conditioning and buffer circuitry, and other components that provide the functionality described in detail below. It is envisioned that the system controller 102 may not include the memory 106 because the memory 106 may be external to the system controller 102.

The system 100 further includes a robot assembly 101 having at least one robotic arm 108 and at least one arm actuator 110, such as a motor, for moving the robotic arm 108. The robotic arm 108 may include at least one elongated support 112 operatively coupled to the arm actuator 110. For example, the elongated support 112 may be mechanically connected to the arm actuator 110. As such, the arm actuator 110 can actuate the robotic arm 108 in order to move (e.g., rotate or translate) the elongated support 112 in three degrees of freedom. In addition to the elongated support 112, the robotic arm 108 includes at least one end effector 114 and a joint 116 interconnecting the elongated support 112 and the end effector 114. As used herein, the term "end effector" refers to a tool capable of performing work on a part X. As non-limiting examples, the end effector 114 may be a gripper, drill, or welding tool. Accordingly, the end effector 114 can, for example, grasp, drill, or weld a part X. The joint 116 may have another three degrees of freedom and therefore allows the end effector 114 to move relative to the elongated support 112. Although the drawings show one arm actuator 110, the robot assembly 101 may include two or more actuators 110. For instance, one arm actuator 110 can move the elongated support 112, and another arm actuator 110 can move the end effector 114 relative to the elongated support 112.

The robotic arm 108 is operatively coupled to the arm actuator 110, and the arm actuator 110 can therefore actuate the robotic arm 108. Upon actuation of the robotic arm 108, the elongated support 112 can move or the end effector 114 can perform an action on the part X. For instance, the arm actuator 110 can actuate the robotic arm 108 in order to grasp or release the part X with the end effector 114. Alternatively or additionally, the arm actuator 110 can actuate the robotic arm 108 in order to rotate the end effector 114 relative to the elongated support 112. The arm actuator 110 can actuate the robotic arm 108 in response to an input or command from the system controller 102. Accordingly, the system controller 102 is in communication, such as electronic communication, with the arm actuator 110.

The system controller 102 is also in communication (e.g., electronic communication) with a conveyor assembly 118. The conveyor assembly 118 may be part of the system 100 and includes a plurality of conveyor belts 120 each configured to transport and move the parts X. Further, the conveyor assembly 118 includes a conveyor actuator 122, such as a motor, operatively coupled to the conveyor belts 120. The conveyor actuator 122 can be turned on in order to move the conveyor belts 120. Aside from the conveyor actuator 122, the conveyor actuator 122 includes part sensors 124 operatively associated with each conveyor belt 120. Each part sensor 124 can detect the presence or absence of a part X at a specific location L along the conveyor belt 120. In the depicted embodiment, each part sensor 124 can be a photoelectric sensor, such as a light emitting diode (LED) sensor, capable of detecting the presence or absence of a part X at the specific location L along the conveyor belt 120. Each part sensor 124 is in communication (e.g., electronic communication) with the system controller 102. Accordingly, the system controller 102 can determine the presence or absence of a part X at the specific location L based on the inputs from the part sensors 124.

The system 100 further includes a visual or optical system 126 in communication (e.g., electronic communication) with the system controller 102. The visual assembly 126 can detect the position and orientation of each part X in the conveyor belts 120. In the depicted embodiment, the visual assembly 126 includes a plurality of cameras 128 capable of capturing images of the parts X. Each camera 128 is operatively associated with one conveyor belt 120 and can therefore capture images of the parts X in the corresponding conveyor belts 120. Specifically, each camera 128 is aligned with at least one conveyor belt 120 such that each camera 128 is configured to capture an image of at least one of the parts X on the corresponding conveyor belt 120. The cameras 128 are in communication (e.g., electronic communication) with the system controller 102. Thus, the system controller 102 can coordinate the operation of all the cameras 128 and can determine the position and orientation of the parts X on the conveyor belts 120 based at least in part on the images captured by the cameras 128. The system controller 102 can in turn send commands to the robotic assembly 101 based at least in part on the position and orientation of the parts X on the conveyor belts 120. The visual assembly 126 may include a light source 130 for illuminating the conveyor assembly 118 and thereby minimize the effects of ambient light, or the lack thereof, when the cameras 128 capture an image of the parts X.

To enhance the quality of the images captured by the cameras 128, certain features of the visual assembly 126 may be tuned in order to detect errors, such as when a part X does not move as planned, and control the system 100 in response to such detected errors. For example, the luminous flux of the light source 130 can be adjusted to minimize the effects of the ambient light on the cameras 128 as discussed above. The system controller 102 can be programmed so that it can identify certain physical features of the part X. It is useful to identify physical features of the part X that can aid the system controller 102 to determine the position and orientation of the part X. Moreover, the exposure time of the cameras 128 can also be adjusted to enhance the quality of the images captured by the cameras 128. As used herein, the term "exposure time" means the amount of time a shutter of the camera is open to allow light to reach the photographic sensor of the camera 128. The contrast threshold of the visual assembly 126 can also be adjusted to enhance the quality of the images taken by the cameras 128. In the present disclosure, the term "contrast" refers to a measure of the difference in brightness between light and dark areas in an image, and the term "contrast threshold" means the minimum perceptible contrast of a camera.

With reference to FIG. 2, the present disclosure also relates to a method 200 for controlling the robot assembly 101. In this method 200, the cameras 128 can capture an image of a part X while the robotic arm 108 is moving in order to the minimize the time necessary to assemble the parts X in order to completely assemble an apparatus, such as a battery. The method 200 begins with step 202. In step 202, the system controller 102 commands the robotic arm 108, via the arm actuator 110, to perform a starting action on a starting part. For example, the system controller 102 may command the robotic arm 108 to pick or drop a starting part X. Alternatively, in step 202, the system controller 102 can command the robotic arm 108 to drill or weld the starting part X. In particular, the system controller 102 can command the end effector 114 to perform work on the starting part X. While the end effector 114 performs work on the starting part X, the robotic arm 108 is in a starting position. Step 202 entails actuating the robotic arm 108 to perform a starting action on a starting part X in response to a command from the system controller 102. After performing the starting action on the starting part X, the system controller 102 sets an action flag F of the start position to OFF in step 202, indicating that the next action on the starting position cannot be performed immediately and, at the same time, the start position is available for new image capturing from the visual processing method 300 (FIG. 3) if the same position will be revisited as the second position by the robotic arm 108. Next, the method 200 proceeds to step 204.

In step 204, the system controller 102 commands the robotic arm 108 to move from a starting position toward a first position. To do so, the system controller 102 can send a command signal (or motion command) to the arm actuator 110. In response to this command signal, the arm actuator 110 actuates to move the robotic arm 108 from the starting position toward the first position. Step 204 therefore entails moving the robotic arm 108 from the starting position toward a first position. Next, the method 200 proceeds to step 206.

In step 206, the system controller 102 determines if the first part X1 will be ready to be subjected to a first action by the robotic arm 108 once the robotic arm 108 reaches the first position. The first action may be the same or different than the prior action. For example, the first action may be picking the first part X1, releasing the first part X1, drilling the first part X1, welding the first part X1, or any other action capable of being performed by the end effector 114 on the first part X1.

In order to determine if the first part X1 will be ready to be subjected to a first action by the robotic arm 108 once the robotic arm 108 reaches the first position, the system controller 102 relies on the visual or optical processing method or subroutine 300 (FIG. 3) described in detail below. The visual processing method 300 (FIG. 3) may be continuously running in the background while the system controller 102 executes the method 200. By using the visual processing method 300 (FIG. 3), the system controller 102 can determine, via the action flag F of the first position, if the first part X1 will be ready to be subjected to a first action by the robotic arm 108 when the robotic arm 108 reaches the first position based at least in part on an action position offset. In the present disclosure, the term "action position offset" means the position deviation of a part X1 from the designated first position of the robotic arm 108 that is stored in the memory 106 and accessible to the processer 104 as well as the controller 102. Thus, the "position deviation of a part from a designated position" refers to the distance from the location of a part to a location designed stored in the memory 106. The action position offset can be determined by executing the visual processing method 300 (FIG. 3) and, the visual processing method 300 takes into account the position and orientation of a part X (e.g., first part X1 or second part X2) when the robotic arm 108 is moving to the action position. In step 206, the system controller 102 determines if the first part X1 will be ready to be subjected to a first action by the robotic arm 108 once the robotic arm 108 reaches the first position based on the action position offset of the first part X1. In other words, the system controller 102 determines if the first part X1 will be ready to be subjected to a first action by the robotic arm 108 once the robotic arm 108 reaches the first position based on the position deviation of the first part X1 in relation to the designated first position of the robotic arm 108. The position deviation of the first part X1 relative to the designated first position of the robotic arm 108 is based at least in part on the position and orientation of the first part X1 when the camera 128 captured an image of the first part X1. As discussed above, the camera 128 captures and processes an image of the first part X1 while the robotic arm 108 is moving toward the first position.

If the system controller 102 determines that the first part X1 will not be ready to be subjected to a first action by the robotic arm 108 when the robotic arm 108 reaches the first position, the system controller 102 executes step 206 again (including the visual processing method 300) until the system controller 102 determines that the first part X1 will be ready to be subjected to the first action by the robotic arm 108 when the robotic arm 108 reaches the first position. In particular, if the first part X1 will not be positioned within the position deviation (i.e., the action position offset) determined using the visual processing method 300, then the method 200 executes step 206 again. Before the executing step 206 again, the system controller 102 may command the visual processing method 300 and the robotic arm 108 to stop for a predetermined amount of time. On the other hand, if the first part X1 will be ready to be subjected to a first action by the robotic arm 108 once the robotic arm 108 reaches the first position, then the method 200 proceeds to step 208.

In step 208, the system controller 102 commences the execution of the visual processing method 300 (FIG. 3) in connection with a process of moving the robotic arm 108 from the first position toward a second position. After executing step 208, the method 200 proceeds to step 210.

In step 210, the arm actuator 110 actuates the robotic arm 108 in order to perform the first action on the first part X1 when the robotic arm 108 reaches the first position. Step 210 therefore entails performing a first action on the first part using the robotic arm 108 only if the first part X1 is within the position deviation from the first position. As discussed above, the robotic arm 108 performs the first action on the first part X1 in response to an earlier command from the system controller 102. The first action may include picking up the first part X1, releasing the first part X1, drilling the first part X1, welding the first part X1, or any other action capable of being performed by the end effector 114. After the robotic arm 108 performs the first action on the first part X1, the system controller 102 sets the action flag F of the first position to OFF, indicating that the next action cannot be performed immediately on the first position and, at the same time, the first position is available for new image capturing from the visual processing method 300 (FIG. 3) if the same position will be revisited by the robotic arm 108. After executing step 210, the method 200 increases the part count by one in step 212 and immediately returns to step 204. This time, however, in step 204, the system controller 102 commands the robotic arm 108 to move from the first position, or re-designated as a new start position, toward a second position, which becomes the new first position. The remaining steps are repeated taking into account that the robotic arm 108 is moving to the new first position, and the robotic arm 108 may need to perform an action on a second part or a new first part, when the robotic arm 108 reaches the second or new first position.

By using the method 200, the system 100 captures an image of a part X (e.g., the first part X1 or second part X2) while the robotic arm 108 is moving toward a first position instead of waiting for the robotic arm 108 to reach the second position, thereby minimizing the cycle time of the manufacturing process. Using the captured image of the part X, the system controller 102 can determine whether the second part X2 will be ready to be subjected to a second action by the robotic arm 108 once the robotic arm 108 reaches the second position. This determination occurs, however, before the robotic arm 108 reaches the second position. Therefore, the method 200 may also be referred to as a look-ahead method. During the methods 200 and 300, the conveyors belts 120 are continuously moving the parts X (e.g., first and second parts X1, X2) relative to the robotic arm 108. It is thus contemplated that the method 200 may also include the step of moving the parts X relative to the robotic arm 108 using one or more conveyor belts 120.

With reference to FIG. 3, as discussed above, the system controller 102 can execute a visual processing method 300 in order to determine if the part X will be ready to be subjected to an action by the robotic arm 108 once the robotic arm 108 reaches the designated position. The visual processing method 300 is continuously executed in the background while the method 200 is executed.

The visual processing method 300 begins with step 302. In step 302, the system controller 102 determines, via the part count in step 212, which part X (e.g., first part X1 or second part X2) has to be subjected to an action by the robotic arm 108. As non-limiting examples, in step 302, the system controller 102 determines which part X has to be grabbed, released, drilled, or welded by the robotic arm 108. The part X that has to be subjected to an action by the robotic arm 108 may be referred to as the identified part. Next, the system controller 102 continues to step 304.

In step 304, the system controller 102 determines if the camera 128 that can capture an image of the part X identified in step 302 (i.e., the identified part) is available to take a picture (or video) of the identified part. For example, if the camera 128 cannot take a picture of the identified part because it is currently taking a picture of another part or there is an action at the camera position, the action flag F in ON status, then the system controller 102 determines that the camera 128 is not available, and the step 304 is repeated until that camera 128 is available. If the camera 128 is available, the action flag F in OFF status, then the method 300 continues to step 306.

In step 306, the system controller 102 determines if the identified part is in a position where a picture of that part can be taken (i.e., the designated part position). This determination can be based at least in part on an input from at least one of the part sensors 124. If the identified part is not in the designated part position and, therefore, the camera 128 cannot take a picture of the identified part, then the method 300 repeats step 306. At this time, the conveyor belt 120 continues to move the identified part relative to the robotic arm 108. If the identified part is in the designated part position and, therefore, the camera 128 can capture an image of the identified part, then the method 300 proceeds to step 308.

In step 308, the system controller 102 receives an image of the identified part, which was previously captured by the camera 128. As discussed above with respect to step 206, the camera 128 can capture an image of the identified part X (e.g., the first part X1 or second part X2) while the robotic arm 108 is moving relative to the conveyor belts 20. After receiving the image of the identified part X, the method 300 proceeds to step 310.

In step 310, the system controller 102 determines an action position offset. As used herein, the term "action position offset" means the position deviation of the identified part (e.g., the first part X1 or second part X2) from its designated position (e.g., a second position) of the robotic arm 108. Specifically, the system controller 102 can determine the action position offset (i.e., the position deviation from the designated position of the robotic arm 108) based at least in part on the input from the information gathered from the captured image of the identified part X (e.g., first part X1 or second part X2). Then, the method 300 continues to step 312.

In step 312, the system controller 102 sets the action flag F to ON, indicating the part X will be ready to be subjected to an action by the robotic arm 108 when the robotic arm 108 reaches the designated position based at least in part on an action position offset. Both the action flag F and the determined action position offset are communicated to the other routine (i.e., the method 200) such that the system controller 102 can determine if the identified part X will be ready to be subjected to an action by the robotic arm 108 once the robotic arm 108 reaches the designated position in step 208.

Figure 4:
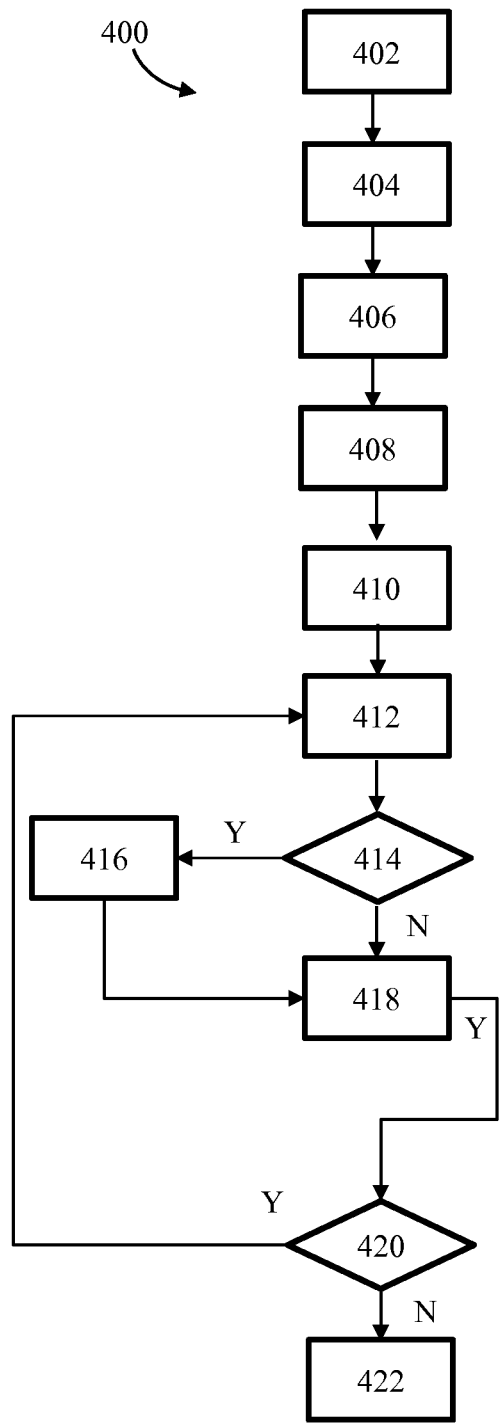
FIG. 4 is a flowchart illustrating a look-head optimizing method, which may be part of the method illustrated in FIG. 2.

With reference to FIG. 4, the present disclosure also relates to a method 400 for determining how many look-ahead actions can be performed while the robotic arm 108 is moving from a first position to a second position. As used herein, the term "look-ahead action" means capturing an image of a part X (e.g., the first part X1 or the second part X2) while the robotic arm 108 is moving and before the robotic arm 108 reaches its target position. In other words, the method 400 can be used to determine how many images of one or more parts can be captured by the cameras 128 while the robotic arm 108 moves from a first position to the second position. The method 400 can therefore be referred to as a look-head optimizing method and can be used, for example, as part of a stacking process. As used herein, the term "stacking process" refers to a process in which several parts are stacked on top of one another. The method 400 begins at step 402.

In step 402, the system controller 102 determines the amount of time it takes the robotic arm 108 to perform a first action (e.g., picking, releasing, drilling, welding) on a first part X1 (i.e., the first action time). Accordingly, the term "first action time" means the amount of time it takes the robotic arm 108 to perform the first action on a first part X1. The first action time may be stored in the memory 106 of the system controller 102. Step 402 entails determining the amount of time needed by the robotic arm 108 to complete the first action on the first part X1. Then, the method 400 proceeds to step 404.

In step 404, the system controller 102 determines the amount of time it takes the robotic arm 108 to travel from the first position to the second position along a programmed path while moving at a constant or variable speed (i.e., the travel path time). The term "travel path time" means the amount of time it takes the robotic arm 108 to travel from the first position to the second position while moving along a programmed path at a constant or variable speed. Step 404 entails determining an amount of time needed by the robotic arm 108 to travel from the first position to the second position. The travel path time may be stored in the memory 106 of the system controller 102. Once the system controller 102 determines the travel path time, the method 400 proceeds to step 406.

In step 406, the system controller 102 determines the amount of time it takes the robotic arm 108 to perform a second action (e.g., picking, releasing, drilling, welding) on a second part X2 (i.e., the second action time). Accordingly, the term "second action time" means the amount of time it takes the robotic arm 108 to perform the second action on the second part X2. Step 406 entails determining the amount of time needed by the robotic arm 108 to complete the second action on the second part. The second action time may be stored in the memory 106 of the system controller 102. Then, the method 400 proceeds to step 408.

In step 408, the system controller 102 determines the total number of repetitive motion sequences that the robotic arm 108 needs to perform to complete a cycle in accordance with the instructions stored in the memory 106 (i.e. the total number of repetitive motion sequences). In the present disclosure, the term "total number of repetitive motion sequences" refers to the total number of repetitive motion sequences that the robotic arm 108 needs to perform to complete a cycle. The total number of repetitive motion sequences may be stored in the memory 106. Next, the method 400 continues to step 410.

In step 410, the system controller 102 determines the total number of look-ahead actions needed to complete a cycle in accordance with the instructions stored in the memory 106 (i.e., the total number of look-ahead actions). As discussed above, the term "look-ahead action" means capturing an image of a part X (e.g., the first part X1 or the second part X2) while the robotic arm 108 is moving. Thus, step 410 entails determining the total number of images needed to complete the cycle. Specifically, the system controller 102 can determine the total number of look-ahead actions by equating the total number of look-ahead actions to the total number of repetitive motion sequences determined in step 408. For example, if a cycle requires five respective motion sequences of the robotic arm 108, then the system controller 102 determines that the total number of look-ahead actions is also five. Next, the method 400 proceeds to step 412.

In step 412, the system controller 102 determines that the number of feasible look-ahead actions while the robotic arm 108 travels from the first position to the second position (i.e., the number of feasible look-ahead actions along an arm travel path). As used herein, the term "arm travel path" means the path traveled by the robotic arm 108 when it moves from a first position to a second position. To determine the number of feasible look-ahead actions along the arm travel path, the system controller 102 subtracts one from the value of the total number of look-ahead actions determined in step 410. For example, if the total number of look-ahead actions (as determined in step 410) is five, then the system controller 102 subtracts one from five and determines that the total number of feasible look-ahead actions while the robotic arm 108 travels from the first position to the second position is four. After determining the number of feasible look-ahead actions, the method 400 continues to step 414.

In step 414, the system controller 102 determines if the number of feasible look-ahead actions along the arm travel path is zero. If the number of feasible look-ahead actions along the arm travel path is zero, the method 400 continues to step 416, in which the system controller 102 adjusts the number of feasible look-ahead actions to one. After adjusting the number of feasible look-ahead actions to one, the method 400 proceeds to step 418. On the other hand, if the number of feasible look-ahead actions is not zero, then the method 400 proceeds directly to step 418.

In step 418, the system controller 102 determines the amount of time it takes the cameras 128 to perform all the feasible look-ahead actions based at least in part on the number of feasible look-ahead actions determined in step 412 or 416 (i.e., the total feasible look-ahead actions time). The "total feasible look-ahead actions time" refers to the time it takes the cameras 128 to perform all the feasible look-ahead actions (i.e., capturing part images) determined in step 412 or 416. Next, the system controller 102 continues to step 420.

In step 420, the system controller 102 determines if all the feasible look-ahead actions previously determined in step 412 or 416 can actually be performed while the robotic arm 108 travels from the first position to the second position. To do so, the system controller 102 compares the total feasible look-ahead actions time with the sum of the following items: (a) the first action time determined in step 402; (b) the travel path time determined in step 404; and (c) the second action time determined in step 406. For example, to perform step 420, the system controller 102 may calculate the following equation:

$$\Sigma_n T(\text{image}_i) > T(A \to B) + P(A) + P(B)$$

wherein:

$\Sigma_n T(\text{image}_i)$ is the amount of time it takes the cameras 128 to perform all the feasible look-ahead actions based at least in part on the number of feasible look-ahead actions determined in step 412 or 416;

T(A→B) is the amount of time it takes the robotic arm 108 to travel from the first position to the second position along a programmed path while moving at a constant or variable speed (i.e., travel path time) as determined in step 404;

P(A) is the amount of time it takes the robotic arm 108 to perform a first action (e.g., picking, releasing, drilling, welding) on a first part X1 (i.e., the first action time) as determined in step 402; and P(B) is the amount of time it takes the robotic arm 108 to perform a second action (e.g., picking, releasing, drilling, welding) on the second part X2 (i.e., the second action time) as determined in step 406. The process of determining the total feasible look-ahead actions is not necessarily performed in real time. The nominal values can be estimated off-line. Further, the action time and traveling time of an individual step are not necessarily the same If the total feasible look-ahead actions time is not greater than the sum of the (a) the first action time determined in step 402; (b) the travel path time determined in step 404; and (c) the second action time determined in step 406, then the method 400 continues to step 422. In step 422, the system controller 102 commands the cameras 128 to perform the number of feasible look-ahead actions (i.e., capturing images of the parts X) as determined in step 412 or 416 while the robotic arm 108 travels from the first position to the second position. Step 422 also entails the performing feasible look-ahead actions determined in step 412 or 416 using the cameras 128.

Also in step 420, if the total feasible look-ahead actions time is greater than the sum of the (a) the first action time determined in step 402; (b) the travel path time determined in step 404; and (c) the second action time determined in step 406, then the method 400 returns to step 412, wherein the system controller 102 readjusts the number of feasible look-ahead actions as discussed above. When determining how many images can be captured while the robotic arm 108 is moving from the first position to the second position, the method 400 considers the image processing time; the specific action of the robotic arm 108; the acceleration, deceleration, and speed of the robotic arm 108; and the operation of the conveyor belts 120.

While the best modes for carrying out the invention have been described in detail, those familiar with the art to which this invention relates will recognize various alternative designs and embodiments for practicing the invention within the scope of the appended claims.

The invention claimed is:

1. A method for controlling a robot assembly, comprising:
   actuating a robotic arm to perform a start action at a start position;
   moving the robotic arm from the start position toward a first position;
   executing, via a controller, a visual processing subroutine, wherein the visual processing subroutine includes:
      determining if a first part will be ready to be subjected to a first action by the robotic arm once the robotic arm reaches the first position;
      determining a position deviation of a second part from a second position;
      determining if the second part will be ready to be subjected to a second action by the robotic arm once the robotic arm reaches the second position; and
   performing the first action on the first part using the robotic arm if the robotic arm is located within a position deviation of the first part from the first position predetermined by the visual processing subroutine.

2. The method of claim 1, further comprising repeating the actuating, moving, executing, and performing steps, wherein the first position is redesignated as the start position, the first action is redesignated as the start action, the second part is redesignated as the first part, the second position is redesignated as the first position, the second action is redesignated as the first action, and the position deviation of the second part from the second position is redesignated as the position deviation of the first part from the first position.

3. The method of claim 2, wherein the visual processing subroutine is an embedded process working continuously in the background.

4. The method of claim 3, wherein the visual processing subroutine includes identifying a next part from a designated position to be subjected to a next action.

5. The method of claim 4, wherein the visual processing subroutine further includes determining if a camera is ready to capture an image of the identified part from the designated position.

6. The method of claim 5, wherein the visual processing subroutine further includes determining if the identified part is in a position where the camera is able to capture the image of the identified part.

7. The method of claim 6, wherein the visual processing subroutine further includes capturing the image of the identified part from the designated position using the camera while the robotic arm is moving toward the designated position.

8. The method of claim 7, determining a position deviation of the identified part from the designated position based at least in part on the position of the identified part while the robotic arm is moving toward the designated position.

9. The method of claim 8, setting a status of the identified part from the designated position to be ready to be subjected to the next action.

10. The method of claim 1, further comprising determining how many images of one or more parts can be captured by cameras while the robotic arm moves from the start position to the first position.

11. A system, comprising:
   a robot assembly including a robotic arm and an arm actuator operatively coupled to the robotic arm, wherein the arm actuator is configured to move the robotic arm from a first position to a second position;
   a conveyor assembly including a plurality of conveyor belts, wherein each of the conveyor belts is configured to move a plurality of parts, the plurality of parts including a first part and a second part;
   a visual assembly including a plurality of cameras, wherein each of the plurality of cameras is aligned with at least one of the conveyor belts; and
   a system controller in electronic communication with the arm actuator and the plurality of cameras, wherein the system controller is configured to:
      command the robotic arm to actuate in order to perform a start action at a start position;
      command the robotic arm to move the robotic arm from the start position toward a first position;
      execute a visual processing subroutine, wherein the visual processing subroutine includes:
         determining if a first part will be ready to be subjected to a first action by the robotic arm once the robotic arm reaches the first position;
         determining a position deviation of a second part from a second position;

determining if the second part will be ready to be subjected to a second action by the robotic arm once the robotic arm reaches the second position; and command the robotic arm to perform the first action on the first part using the robotic arm if the robotic arm is located within a position deviation of the first part from the first position predetermined by the visual processing subroutine.

12. The system of claim 11, wherein the system controller is also programmed to repeat the commands, wherein the first position is redesignated as the start position, the first action is redesignated as the start action, the second part is redesignated as the first part, the second position is redesignated as the first position, the second action is redesignated as the first action, and the position deviation of the second part from the second position is redesignated as the position deviation of the first part from the first position.

13. The system of claim 12, wherein the visual processing subroutine is an embedded process working continuously in the background.

14. The system of claim 13, wherein the visual processing subroutine includes identifying a next part from a designated position to be subjected to a next action.

15. The system of claim 14, wherein the visual processing subroutine further includes determining if a camera is ready to capture an image of the identified part from the designated position.

16. The system of claim 15, wherein the visual processing subroutine further includes determining if the identified part is in a position where the camera is able to capture the image of the identified part.

17. The system of claim 16, wherein the visual processing subroutine further includes capturing the image of the identified part from the designated position using the camera while the robotic arm is moving toward the designated position.

18. The system of claim 17, wherein the visual processing subroutine further includes determining a position deviation of the identified part from the designated position based at least in part on the position of the identified part while the robotic arm is moving toward the designated position.

19. The system of claim 18, wherein the visual processing subroutine further includes setting a status of the identified part from the designated position to be ready to be subjected to the next action.

20. The system of claim 11, wherein the system controller is programmed to determine how many images of one or more parts can be captured by cameras while the robotic arm moves from the start position to the first position.

* * * * *